Figure 5:
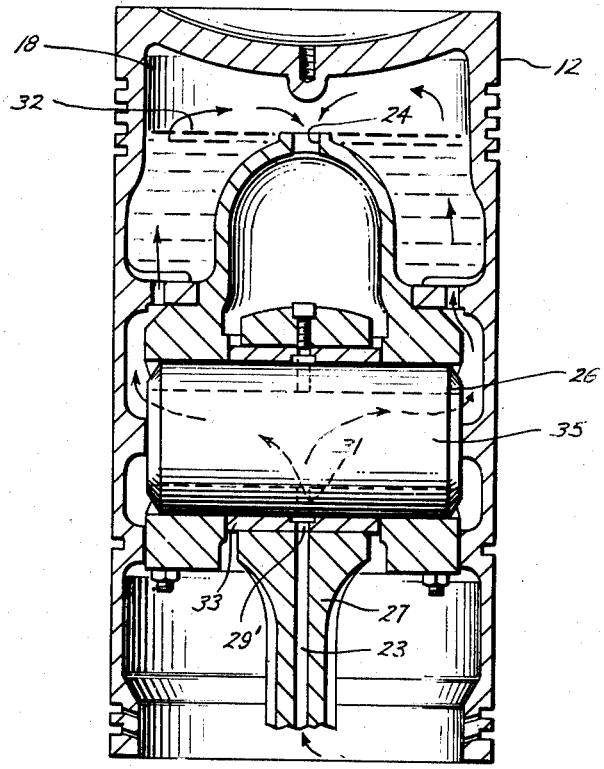

July 15, 1958  J. M. HARING  2,843,221
FORCE FEED LUBRICATING DEVICE FOR PISTONS
Filed May 4, 1955  2 Sheets-Sheet 1
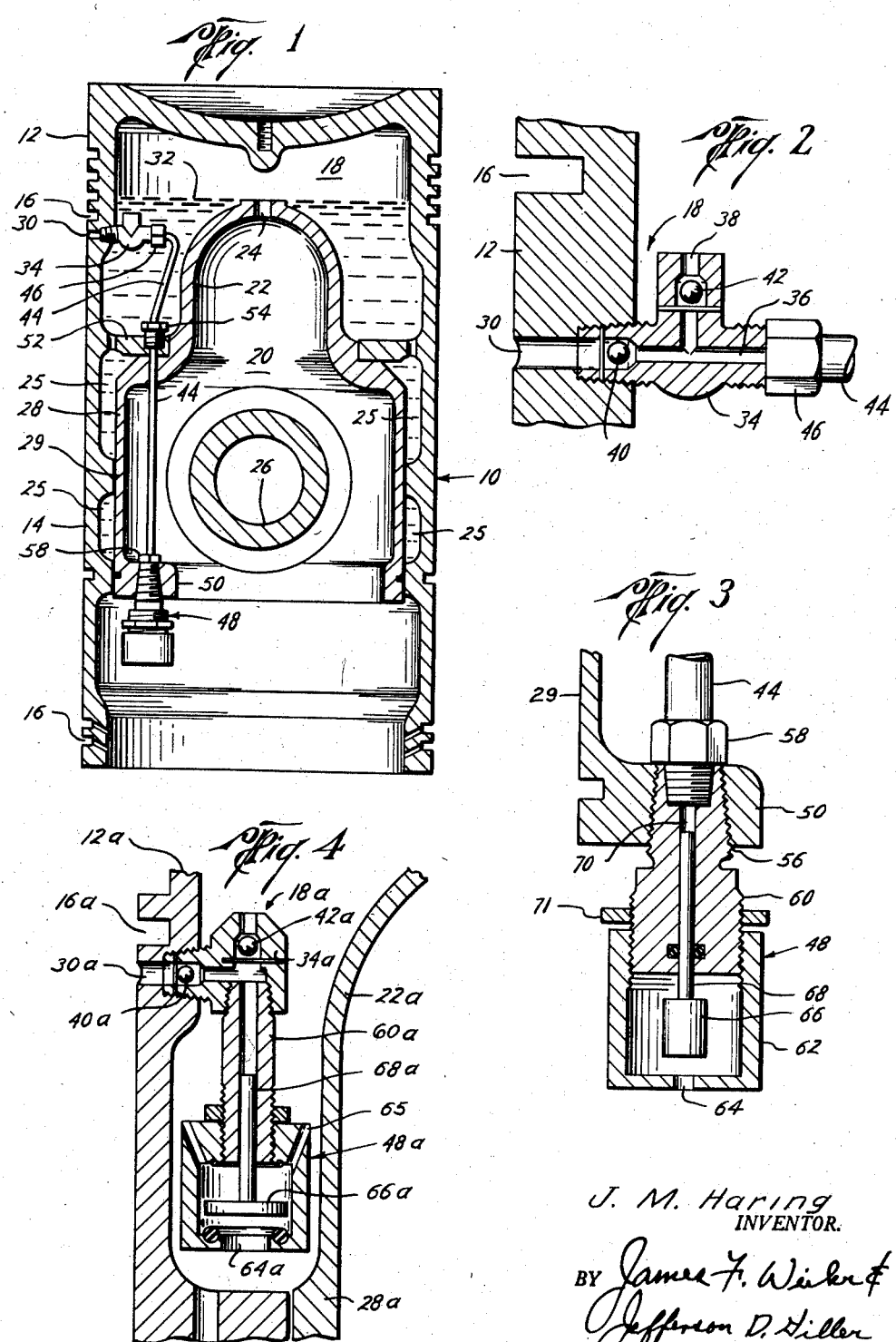
J. M. Haring
INVENTOR.
BY James F. Weikert
Jefferson D. Giller
ATTORNEYS July 15, 1958     J. M. HARING     2,843,221
FORCE FEED LUBRICATING DEVICE FOR PISTONS
Filed May 4, 1955     2 Sheets-Sheet 2

J. M. Haring
INVENTOR.

BY *James F. Weiler*
*Jefferson D. Giller*
ATTORNEYS

United States Patent Office 2,843,221
Patented July 15, 1958

2,843,221

FORCE FEED LUBRICATING DEVICE FOR PISTONS

John M. Haring, Ponca City, Okla., assignor to Nickles Machine Corporation, Ponca City, Okla., a corporation of Oklahoma Application May 4, 1955, Serial No. 505,961

6 Claims. (Cl. 184—18)

The present invention relates to a force feed lubricating system for reciprocating pistons such as used in engines, compressors and the like and, more particularly, relates to such a device in which the lubricant is forced under pressure from the inside of the piston through an aperture or series of apertures in the piston body.

The present invention has reference and is applicable generally to engines, compressors and the like for providing lubrication between the clearance or space of the piston and cylinder wall and is particularly adaptable to large stationary engines.

Most of the present force feed lubricating systems used in stationary engines of the larger type consist of a gear pump or individual plunger pumps which supply oil pressure from a pump to a check valve mounted on the outside of the cylinder and through a drilled portion of the cylinder wall to admit oil to the inside wall to lubricate the piston. In large stationary engines, the friction developed between the piston and cylinder wall is tremendous and presents a serious problem of efficiency, maintenance and repair, and economy of operation. It would be highly advantageous to provide a lubricator which would increase efficiency, reduce friction and prolong the life of large piston and cylinder assemblies as well as making them more economical to operate and maintain.

The present invention is applicable to those systems in which oil is supplied from inside the piston through the piston body and then to the cylinder wall. It is not applicable to those systems whereby the oil or lubricant is admitted through the cylinder wall nor to the various so-called "splash" systems except that as applied to the previously-mentioned systems it constitutes an improvement over these last-mentioned systems.

It is therefore an object of the present invention to provide an improved force feed lubricating device for reciprocating pistons in which the lubricator is located inside the piston and which efficiently lubricates the space between the piston and cylinder wall thereby reducing friction, increasing efficiency and providing economical operation and maintenance.

It is a yet a further object of the present invention to provide such a force feed lubricator for reciprocating pistons which lubricator is actuated automatically in response to inertia or the inertia force generated by the reciprocating piston to which it is applied.

Yet a further object of the present invention is the provision of such a lubricator which is actuated in response to upward flow of oil against the bottom of a disk thereby providing an automatic force feed lubricating system in response to reciprocation of the piston.

Yet a further object of the present invention is the provision of such an improved force feed lubricator disposed on the inside of the piston which is actuated by a combination of the inertia force of the reciprocating piston and the upward flow of oil or lubricant against the bottom of the disk of the pumping mechanism of the lubricator.

Yet a further object of the present invention is the provision of such a force feed lubricating device which is efficiently reliable in use, which may be applied easily and readily to a variety of pistons of the reciprocating type at a minimum of cost and expense and which is efficiently durable in use and readily and easily repaired and maintained.

Other and further objects and features of the invention will be apparent as a description of presently preferred examples of the invention are given for the purpose of disclosure, taken in conjunction with the accompanying drawing, in which like reference characters refer to like or corresponding parts throughout the several views, and where Figure 1 is a sectional, side elevation view illustrating a typical reciprocating piston having a force feed lubricator according to the invention, Figure 2 is an enlarged, sectional, fragmentary view illustrating the check valve arrangement of the force feed lubricator of Figure 1, Figure 3 is an enlarged fragmentary view, partly in section, illustrating an inertia type plunger arrangement shown in Figure 1, Figure 4 is a fragmentary, elevation, partly in section illustrating a modified force feed lubricator according to the invention, and Figure 5 is a cross-sectional view similar to that of Figure 1, but rotated at an angle of 90° and adding a connecting rod and illustrating the flow of lubricant into the piston.

Referring now to the drawing, and particularly to Figure 1, a representative or typical piston, generally designated by the reference numeral 10 is illustrated which has the piston head 12 and the skirt portion 14 both of which have the grooves 16 about their exteriors to receive the usual piston rings. The piston is divided internally into two parts, that is an upper lubricant reservoir chamber 18 and a lower portion or chamber 20 as formed by the web-like partition 22 which has the opening 24 at its upper central portion.

As best seen in Figure 5, the opening 24 is the lubricant reservoir chamber overflow drain. It serves to maintain the oil or lubricant level from the bottom of the cross-head pin 26 up to the opening 24 and then lets excess lubricant spill back into the crankcase through the lower portion or chamber 20 around the pin 26 and down along the connecting rod 27. The cooling lubricant reaches the piston in a conventional manner. The main lubricant pump, not shown, forces lubricant through the crankshaft, not shown, through the rifle-drilled passage 23 in the connecting rod 27 through the passages 29' and 31 in the liner 33 and pin 26, respectively, to the inside passage 35 of the cross-head pin 26 to which it is connected. The lubricant then flows out the passage 35 at each end of the cross-head pin 26 up the annular space 25 between the piston wall 14 and the pin hanger 28 to the upper lubricant reservoir chamber 18 and back through the opening 24 to the crankcase for cooling and recirculation. Thus, the piston is oil or lubricant cooled from the bottom of the pin 26 up to the top of the piston. This oil or lubricant cooling and circulation is conventional and no further description is deemed necessary.

As shown in Figure 1 the upper lubricant reservoir chamber 18 may be formed by the generally rounded and upwardly extending web partition 22 connected to the depending skirt 29 of the pin hanger 28 which is secured to the skirt portion 14 of the piston 10. It should be noted that the piston may be divided into an upper lubricant reservoir chamber 18 in any preferred manner.

As best seen in Figure 2, and turning now to this figure, it is seen that an opening or outlet passage 30 is provided through the piston wall of the piston head 12 adjacent or below the static level 32 of the lubricant in the upper lubricant reservoir chamber 18, as best seen in Figure 1. Turning again to Figure 2 it is noted that a fitting 34 is threaded or otherwise secured to the inner end of the passage 30 which is provided with the outlet passage 36 extending through the fitting and includes the lateral inlet passage 38 extending or opening into the oil or lubricant in the upper lubricant reservoir chamber 18. A pair of check valves 40 and 42 are provided at the outer ends of the passages 36 and 38, respectively. It will thus be seen that check valve 40 permits flow of lubricant outwardly through the outlet passage 30 into the space between the piston and the cylinder wall, not shown, and prevents flow of lubricant therefrom back into the passage 30. The check valve 42 permits flow of lubricant into the inlet passage 38 from the upper lubricant reservoir chamber 18 but prevents the flow of lubricant outwardly of the inlet passage 38.

As best seen in Figures 1 and 2, the passage 36 is connected to the tube 44, such as by means of the threaded connection 46. The tube 44 extends downwardly to what might be referred to as the lubricant pump 48 which is threaded or otherwise secured to the internal flange 50 at the lower portion of the skirt 28. The tube 44 is supported by the internal flange 52 and threaded connection 54. Thus, the tube 44 and pump 48 are supported and provided with the required stability throughout the stroke of the piston 10.

The lubricant pump 48 is best illustrated in Figure 3, and turning now to this figure, it is seen that it may be threaded, as at 56, or otherwise secured to the flange 50 and is connected by means of the nut 58 to the lower end of the tube 44.

The lubricant pump 48 includes the pump cylinder 60, the lower end of which is threaded or otherwise secured to a chamber 62 which has the opening 64 provided in its lower end and in which is movably disposed a weight member 66 secured to the lower end of the plunger 68, which plunger 68 is movably disposed in the pump cylinder bore 70 of the pump cylinder 60, the pump cylinder bore 70 being in fluid communication with the tube 44. Thus, as the plunger 68 is moved back and forth or reciprocated in the pump cylinder bore 70 it provides a pumping action for the fluid in the interconnected passages 40, 44, 36, 38 and 30. The weight member 66 is, in effect, an inertia member so that at the end of a stroke and the beginning of the movement of the piston in the opposite direction, the plunger 68 is moved with respect to the pump cylinder 60 thereby providing a pumping action. A lock nut 71 is provided for adjusting the position of the chamber 62 and thereby the length of the stroke of the plunger 68.

In operation, the piston 10, of course, is reciprocated and lubricant is pumped up the annular space 25 to the upper lubricant reservoir chamber 18 and overflows through the overflow opening 24 and flows back to the crankcase for cooling and recirculation. The oil or lubricant assumes what may be termed a static level 32 in the upper lubricant reservoir chamber 18. As the piston reciprocates the plunger 68 also reciprocates with respect to the pump cylinder 60 due to the inertia of the weight member 66 in continuing its movement when the pump cylinder 60 stops thereby providing a relative reciprocating movement of the plunger 68 in the pump cylinder bore 70. When the plunger 68 moves in a downwardly direction, lubricant is sucked in the inlet passage 38 past the check valve 42 and the check valve 40 prevents lubricant from being drawn into the outlet passage 30. When the plunger 68 moves upwardly with respect to the pump cylinder bore 70 the lubricant which has been sucked into the passage 38 and the interconnecting passage 36 and tube 44 is forced outwardly by means of the reciprocatory pumping motion of the plunger or piston 68, the check valve 42 closing the inlet passage 38 thereby preventing oil or lubricant being forced back up into the upper lubricant reservoir chamber 18, the check valve 40 permitting the lubricant to be forced under considerable pressure through the outlet passage 30 into the space between the piston and the piston cylinder thereby efficiently lubricating this space.

Thus, during each cycle of the piston, oil or lubricant is sucked into the passages 38, 36, 44 and 40 and is pumped through the outlet passage 30 under considerable pressure to provide lubrication in a fully automatic manner.

Turning now to Figure 4, a modification is illustrated. For convenience of reference, like or corresponding parts have the reference "a" added.

It will be noted that this particular arrangement is in all respects similar to that illustrated in Figures 1, 2 and 3 except that the entire plunger or pump mechanism has been placed in the upper lubricant reservoir chamber 18a and the member 66a takes the form of a rather flat disk-like member so that lubricant in the upper lubricant reservoir chamber 18a flows up against the lower surface thereof or downwardly against the upper surface thereof to effect movement of the plunger or piston 68a. To insure this flow, an additional opening 65 is provided in the chamber 62a. All other parts are the same and no detailed description with respect thereto is deemed necessary.

Thus, in the embodiment of Figure 4, as the piston moves upwardly, lubricant flows downwardly against the upper face of the disk 66a thereby causing a downward movement of the plunger 68a, and as the piston moves downwardly lubricant flows against the lower face of the disk 66a thereby forcing the plunger or piston 68a upwardly which causes the pumping action previously described. The remaining parts and operation are the same as that described in connection with Figures 1, 2 and 3 and no further description is deemed necessary.

It should be noted that in the modification of Figure 4 the pumping device must be positioned in lubricant for it to function properly. If desired, the pumping element 48 of Figure 1 may be moved up into the upper lubricant reservoir chamber as illustrated in Figure 4. Also, by providing some mass to the member 66a or providing a larger surface to the inertia member 66 a combined inertia and lubricant flow movement is or may be obtained.

While only one lubricator has been illustrated for a piston, it will be understood that two or more such lubricators may be provided, particularly in those engines of considerable size.

Accordingly, the present invention is well suited to attain the objects and ends as well as having the features mentioned and others inherent therein. Also, numerous changes and rearrangements of parts may be made which will readily suggest themselves to those skilled in the art.

The present invention, therefore, is to be limited only by the spirit thereof and the scope of the appended claims.

What is claimed is:

1. A force feed lubricator for a piston having an upper lubricant reservoir chamber and a lower chamber provided with a passage from the lubricant reservoir chamber to the lower chamber comprising, a pump cylinder rigidly mounted interiorly of the piston and provided with a bore therethrough, a plunger reciprocally mounted in the bore, the plunger having sufficient mass whereby it moves relative to the pump cylinder on reciprocation of the piston, said piston provided with an outlet through its wall, a conduit connecting the outlet with the bore of the pump cylinder, a first check valve in the outlet permitting outflow of lubricant but preventing inflow thereof, said conduit provided with an inlet in the upper lubricant reservoir chamber, and a second check valve in the inlet permitting inflow of lubricant into the conduit but preventing outflow thereof whereby reciprocation of said piston effects a pumping action of said plunger whereby lubricant flows into the conduit and is pumped through the outlet.

2. The force feed lubricator of claim 1 where the plunger includes an inertia member.

3. The force feed lubricator of claim 1 where the pump cylinder and said plunger are mounted in the upper lubricant reservoir chamber, and includes a member rigidly connected to said plunger, said member being disposed in lubricant in said upper lubricant reservoir and provided with a surface responsive to force of the lubricant thereagainst.

4. The force feed lubricator of claim 1 where the pump cylinder is disposed in the upper lubricant reservoir chamber.

5. The force feed lubricator of claim 1 where the pump cylinder is disposed in the lower chamber.

6. A force feed lubricated piston comprising, a piston body, a partition dividing the piston into an upper lubricant reservoir chamber and a lower chamber, said partition being provided with an opening to permit flow of lubricant therethrough, a pump cylinder rigidly mounted interiorly of the piston and provided with a bore therethrough, a plunger reciprocally mounted in the bore, said plunger having sufficient mass whereby it moves relative to the pump cylinder on reciprocation of the piston, said piston provided with an outlet through its wall, a conduit connecting the outlet with the bore of the pump cylinder, a first check valve in the outlet permitting outflow of lubricant but preventing inflow of lubricant therethrough, said conduit provided with an inlet in the upper lubricant reservoir chamber, and a second check valve in the inlet permitting inflow of the lubricant into the conduit but preventing outflow of the lubricant therethrough whereby reciprocation of said piston effects a pumping action of said plunger whereby lubricant flows into the conduit and is pumped out the outlet.

References Cited in the file of this patent

UNITED STATES PATENTS

| 878,783 | Downie | Feb. 11, 1908 |
| 1,412,833 | Blache | Apr. 18, 1922 |
| 1,574,181 | Baker | Feb. 23, 1926 |

FOREIGN PATENTS

| 422,386 | France | Mar. 20, 1911 |